United States Patent [19]

Kass

[11] Patent Number: 4,832,891
[45] Date of Patent: May 23, 1989

[54] METHOD OF MAKING AN EPOXY BONDED RARE EARTH-IRON MAGNET

[75] Inventor: Allen Kass, Pittsford, N.Y.

[73] Assignee: Eastman Kodak Company, Rochester, N.Y.

[21] Appl. No.: 125,295

[22] Filed: Nov. 25, 1987

[51] Int. Cl.$^4$ .......................... B29C 67/24; H01F 1/08
[52] U.S. Cl. ...................... 264/101; 29/608; 148/101; 148/105; 148/302; 148/306; 252/62.54; 264/109; 264/123; 264/236; 264/DIG. 58
[58] Field of Search ............... 264/109, 123, 101, 236, 264/DIG. 58; 29/608; 148/101, 105, 302, 306; 252/62.54

[56] References Cited

U.S. PATENT DOCUMENTS

| | | | |
|---|---|---|---|
| 3,115,461 | 12/1963 | Danis et al. | 29/608 |
| 3,424,578 | 1/1969 | Strnat et al. | 75/213 |
| 3,933,536 | 1/1976 | Doser et al. | 148/105 |
| 3,935,339 | 1/1976 | Cooke, Jr. | 472/216 |
| 3,985,588 | 10/1976 | Lyman | 148/103 |
| 4,264,361 | 4/1981 | Yajima et al. | 75/230 |
| 4,289,549 | 9/1981 | Kasai | 148/101 |
| 4,497,722 | 2/1985 | Tsuchida et al. | 252/62.54 |
| 4,541,877 | 9/1985 | Stadelmaier et al. | 148/101 |
| 4,558,077 | 12/1985 | Gray | 523/458 |

FOREIGN PATENT DOCUMENTS

| | | | |
|---|---|---|---|
| 0125752 | 11/1984 | European Pat. Off. | |
| 999389 | 7/1965 | United Kingdom | 264/123 |

Primary Examiner—Jeffery Thurlow
Assistant Examiner—Leo B. Tentoni
Attorney, Agent, or Firm—Robert L. Randall

[57] ABSTRACT

A method of making a bonded permanent magnet including the steps of dissolving, in a solvent, an uncured epoxy resin having an incorporated catalyst which is inactive at a temperature of about 120° F. Particles of a rapidly quenched rare earth-iron-boron alloy are added to the epoxy resin solution. The solution with the particles are mixed at a temperature of about 120° F. until the solvent is removed and the magnetic particles are substantially uniformly coated with the resin. The epoxy coated particles are then cold-pressed into a compact to form a magnet and the epoxy compact is then cured by heating.

8 Claims, No Drawings

METHOD OF MAKING AN EPOXY BONDED RARE EARTH-IRON MAGNET

BACKGROUND OF THE INVENTION

1. Field of the Invention

This invention relates to compacted rare earth-iron-boron particle magnets that are produced by a novel process whereby the magnetic particles are protected from oxidation during and after manufacture to create a durable, flux-loss resistant permanent magnet.

2. Description of the Prior Art

Recently a novel family of magnetic alloys with enhanced permanent magnetic strength have been disclosed. These alloys are based on light rare earth elements (RE), specifically neodymium and praseodymium, the transition metal element, iron, and boron. This material and a method of manufacturing bonded magnets from it are disclosed in U.S. Pat. No. 4,558,077 and the U.S. Pat. applications disclosed therein. These magnetic alloys have been marketed under the trade name "MAGNEQUENCH".

It is well known that the magnetic particles produced by the above-referenced process have a large surface area per unit volume and are of a composition that is reactive to ordinary atmosphere. Moreover, it is known that when these magnetic particles are exposed to the atmosphere they are oxidized, irreversibly decreasing the coercive force available from such particles. Heretofore, a variety of attempts have been made to protect these magnetic particles from such oxidation including the method disclosed in the U.S. Pat. No. 4,558,077 noted above, as well as those disclosed in U.S. Pat. No. 3,933,536. All of these processes have attempted to coat the individual particles with an inert coating to prevent the oxidation of the magnetic particles. The U.S. Pat. No. 4,558,077 discloses a plurality of prior art processes for coating the magnetic particles and for bonding the particles together to form a magnet. That patent also discusses the problems associated with the prior art methods and proposes a new method of manufacturing magnets wherein the magnetic particles are mixed with a dry epoxy powder and then pressed to form the final magnet. While this process does provide some protection to the magnetic particles, it is not totally satisfactory since the final magnet may still exhibit loss of magnet coercivity upon exposure to the atmosphere.

The method of manufacturing a magnet disclosed in the U.S. Pat. No. 3,933,536 includes the mixing of the magnetic powder materials with a polymer and then precipitating the particles from the solution. However, as noted in the U.S. Pat. No., 4,558,077, it is believed that that method is unsuitable for producing the desired high density magnets since it does not remove all of the solvent from the precipitated polymers.

Still further, it has been found that the above processes of manufacturing magnets have resulted in the production of a wet paste containing the magnetic particles which requires further grinding to regenerate the particles necessary to form into the final magnet. It has been found that such regrinding strips a portion of the protective coating from the magnetic particles thereby exposing them to the atmosphere which adversely affects the magnetic properties of the final magnet.

Accordingly, the provision of a method for manufacturing epoxy bonded rare earth-iron magnets which provides adequate protection against oxidation or reactivity of the magnetic particles as well as the requisite compressed density of the particles would provide an extremely desirable magnet.

SUMMARY OF THE INVENTION

Accordingly, the present invention provides a method of making a bonded permanent magnet comprising the steps of dissolving, in a solvent, an uncured epoxy resin having an incorporated catalyst which is inactive at a temperature of about 120° F. Particles of a rapidly quenched rare earth-iron-boron alloy are added to the epoxy resin solution. The solution with the particles are mixed at a temperature of about 120° F. until the solvent is removed and the magnetic particles are substantially uniformly coated with the resin. The epoxy coated particles are then cold-pressed into a compact to form a magnet and the epoxy compact is then cured by heating.

Further, the present invention provides a method of making a bonded permanent magnet comprising the steps of dissolving an uncured thermally curable biphenyl A epoxy resin having an incorporated catalyst which is inactive at a temperature of about 120° F. in an acetone solvent. Magnetic particles of a rapidly quenched rare earth-iron-boron alloy having a size of from about 30 microns to about 500 microns are added to the epoxy resin solution whereby the resin equals about 1.3 to 3 weight percent of the final compact. The magnetic particles are mixed in the solution at a temperature of about 120° F. and at a vacuum of about 25–29 inches of Hg until the solvent is removed and the magnetic particles are substantially uniformly coated with the resin. The epoxy coated particles are cold-pressed at a pressure of about 100,000 psi into a compact having a density of about 5.0–6.0 grams per cc, and the compact is cured by heating to about 250° F. for one hour and then heating at 350° F. for an additional hour.

Still further, the present invention provides a bonded permanent magnet made by the foregoing process.

DETAILED DESCRIPTION OF A PREFERRED EMBODIMENT

The present invention applies to finely divided magnetic materials available under the trade name "MAGNEQUENCH" from the General Motors Corporation. The particles comprise a −40 mesh (approximately 420 micron) powder that are formed of light rare earth elements, the transition metal element iron, and boron which particles are, produced by the melt spinning technique described in the U.S. Pat. No. 4,558,077, noted above. These particles are of a size and consistency to provide a free-flowing powder so that they may be handled by the conventional powder metallurgy techniques.

The magnetic particles are coated with a layer of an epoxy resin by the process of the present invention to protect the particles from the deleterious effect of direct exposure to the atmosphere. The resin also facilitates the compression of the powder into a dense magnet compact having superior magnetic properties.

The epoxy resin has an incorporated catalyst that is heat-curable at a temperature substantially above 120° F. The resin is dissolved in a solvent such as alcohol or acetone and the magnetic particles are then added to the solution and mixed thoroughly therewith. The epoxy/powder solution is then thoroughly mixed in a Ross planetary mixer at a temperature of about 120° F. and a vacuum of about 25–29 inches of Hg until the solvent is driven off and the particles are coated and dried. The powder is then cold-pressed in a mold having the configuration desired for the final magnetic product.

The following example is intended to be illustrative rather than limiting and is intended to magnet according to the present invention.

EXAMPLE 1

An epoxy resin, such as Fiberite X-29448 or Fiberite E-46881, having an incorporated heat-curable catalyst was dissolved in a solvent. Approximately 5 grams of resin was dissolved in 75-100 grams of a solvent such as alcohol or acetone. Approximately 200 grams of -40 mesh "MAGNEQUENCH" powder was then thoroughly mixed with the dissolved epoxy resin. The magnetic powder/epoxy solution was then dried at a temperature of about 120° F. while being thoroughly mixed for approximately one hour until all the solvent was removed and the material returned to powder form, with the magnetic powder now coated with the epoxy resin. The coated powder was then cold-pressed in an appropriate mold resulting in a compact that had sufficient green strength to permit handling and removal from the mold. The compact was then cured at a temperature of about 250° F. for about one hour and then at a temperature of about 350° F. for an additional hour. The dried compressed magnet was then coated with an epoxy or other protective coating and then was magnetized.

EXAMPLE 2

In another example, the epoxy solution and magnetic powder were mixed in a batch totalling 15 to 20 pounds and the resulting mixture was mixed and dried in a 5-gallon Ross planetary mixer for about one hour at about 120° F. and a vacuum of 25-29 inches of Hg. At the end of this time the magnetic particles were thoroughly coated with the epoxy resin and were in a free flowing powder form. The powder was then cold pressed into a compact at a pressure of about 100,000 psi with a density of about 5.0-6.0 grams per cc. The magnet compact was the cured by heating as above.

It has been found that a magnetic powder/epoxy resin mix wherein the epoxy resin equals about 0.6 to 6.0 weight percent of the final compact, and preferably equalling about 1.3 to 3.0 weight percent, provide preferred results for the present invention. Moreover, while the magnetic powder is referred to in the preferred embodiment as having a size of approximately −b 40 mesh (equalling about 420 microns); however, it has been found that handling of the magnetic powder according to powder metallurgy techniques permits the handling of powders having a size range of from about 30 to about 550 microns with equal results.

Other epoxies have also been found to be acceptable for use in the process of the present invention. For example, the epoxy resins identified in the U.S. Pat. No. 4,558,077, above, as well as others having the noted characteristics, may also be used.

Accordingly, the present invention provides a method of manufacturing a rare earth-iron-boron magnet which provides better uniformity to the final magnet compact, because of the uniform dispersion of the magnetic particles in the epoxy resin, as well as improved productivity for the process. Still further, inasmuch as the resin protects each particle and since the entire material is subject to less handling than necessary with prior art processes the magnetic particles are provided with protection against corrosion and thus loss of magnetic strength.

The invention has been described in detail with particular reference to a presently preferred embodiment, but it will be understood that variations and modifications can be effected within the spirit and scope of the invention.

What is claimed is:

1. The method of making a bonded permanent magnet comprising the steps of:
   dissolving in a solvent an uncured epoxy resin having an incorporated catalyst which is inactive at a temperature of about 120° F.;
   adding particles of a rapidly quenched rare earth-iron-boron alloy to the epoxy resin solution;
   mixing said solution with said particles at a temperature of about 120° F. until said solvent is removed and said particles are substantially uniformly coated with said resin and are insubstantially free flowing powder form;
   cold pressing the epoxy resin coated particles into a compact to form a magnet; and
   curing said epoxy resin by heating said compact to a temperature of between about 250° F. and about 350° F. for a period of about 1-2 hours.

2. The method according to claim 1 wherein said uncured epoxy resin equals about 1.3 to 3 weight percent of the final compact.

3. The method according to claim 1 wherein said epoxy resin is cured by heating to about 250° F. for about one hour and then heating at about 350° F. for about one hour.

4. The method according to claim 1 wherein said particles of rare earth-iron boron alloy have a size of about 30-550μ.

5. The method according to claim 1 wherein said cured compact has a density of about 5.0-6.0 gm/cc.

6. The method according to claim 1 wherein said mixing occurs under a vacuum of about 25-29 inches of Hg.

7. The method according to claim 1 wherein said coated particles are pressed at a pressure of about 100,000 psi.

8. The method of making bonded permanent magnet comprising the steps of:
   dissolving in an acetone solvent an uncured thermally curable biphenol A epoxy resin having an incorporated catalyst which is inactive at a temperature of about 120° F.;
   adding magnetic particles of a rapidly quenched rare earth-iron-boron alloy having a size of from about 30μ to about 500μ to the epoxy resin solution whereby said resin equals about 1.3 to 3 weight percent of the final compact;
   mixing said solution with said magnetic particles at a temperature of about 120° F. and at a vacuum of about 25-29 inches of Hg until said solvent is removed and said magnetic particles are substantially uniformly coated with said resin and are in substantially free flowing powder from;
   cold pressing the epoxy resin coated particles at a pressure of about 100,000 psi into a compact having a density of about 5.0-6.0 gm/cc to form a magnet; and
   curing said epoxy resin by heating said compact to about 250° F. for one hour and then heating at 350° F. for an additional hour.

* * * * *